United States Patent [19]

Ferris

[11] Patent Number: 4,770,044
[45] Date of Patent: Sep. 13, 1988

[54] AIR CONDITIONER TEST GAUGE WITH PRESSURE ZONE MARKINGS

[76] Inventor: James E. Ferris, 18 High Mesa Pl., Richardson, Tex. 75080

[21] Appl. No.: 26,293

[22] Filed: Mar. 16, 1987

Related U.S. Application Data

[63] Continuation-in-part of Ser. No. 873,386, Jun. 12, 1986, Pat. No. 4,693,112.

[51] Int. Cl.⁴ .......................... B60C 23/02; G01L 7/16
[52] U.S. Cl. ..................................... 73/744; 73/146.8; 116/272; 116/335
[58] Field of Search ................... 73/146.8, 146.2, 714, 73/744; 116/34 R, DIG. 41, 335, 266, 272

[56] References Cited

U.S. PATENT DOCUMENTS

| | | | |
|---|---|---|---|
| 376,103 | 1/1888 | Mitchell | 116/335 |
| 3,260,233 | 7/1966 | Bergunder | 116/34 R |
| 4,244,214 | 1/1981 | Curran | 116/34 R |
| 4,526,030 | 7/1985 | Vecera, Jr. | 73/146.8 |

*Primary Examiner*—Donald O. Woodiel
*Attorney, Agent, or Firm*—Warren H. Kintzinger

[57] ABSTRACT

A refrigerant system gas pressure check gauge with a valve head opening having a valve pin and shaped to fit on and over the low pressure suction side valve fitting of a refrigeration system, auto or home, with colored zones and safety markings with worded indications including safety danger warnings. The colored zones and safety markings directly match precise pressure zones on the valve stem.

15 Claims, 3 Drawing Sheets

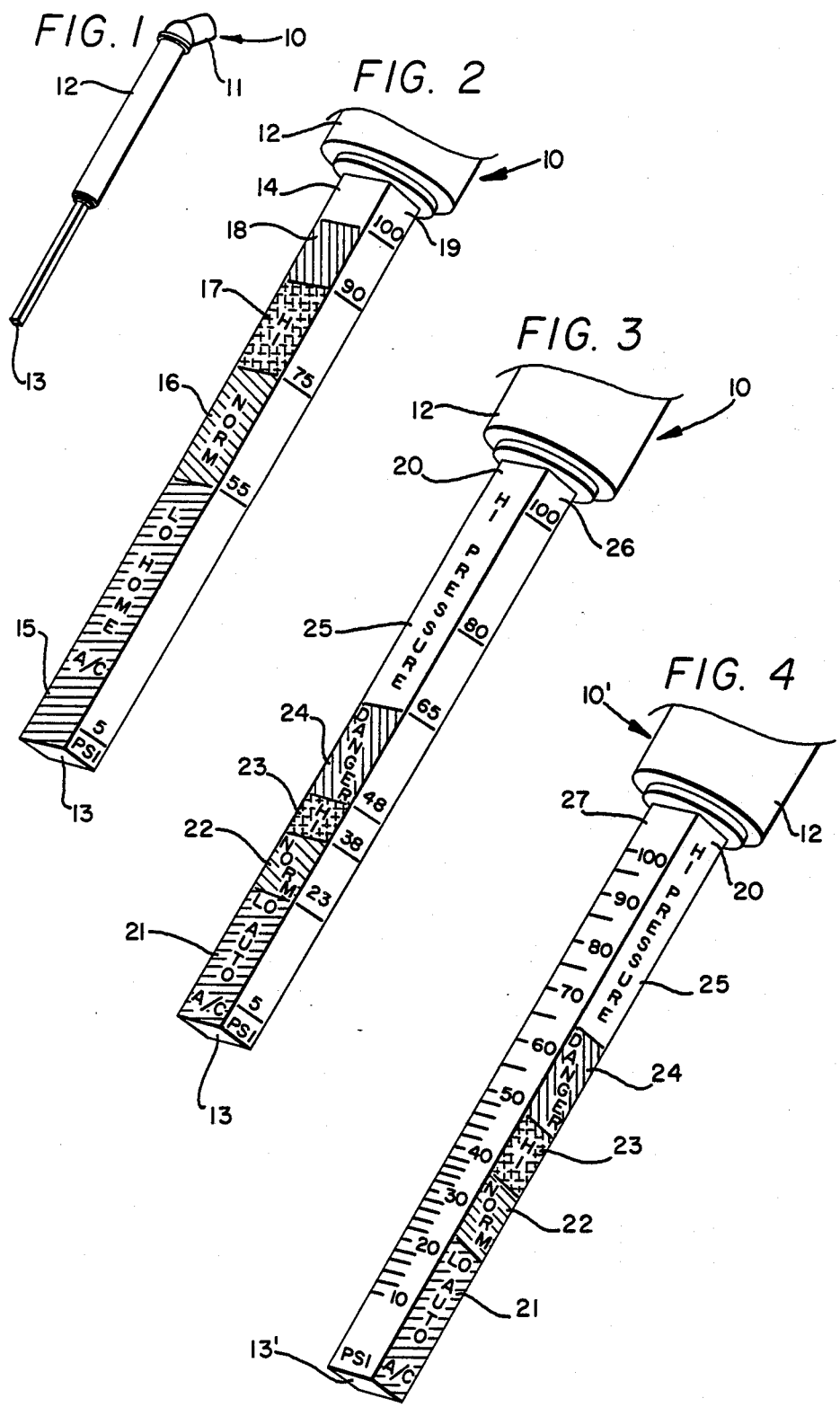

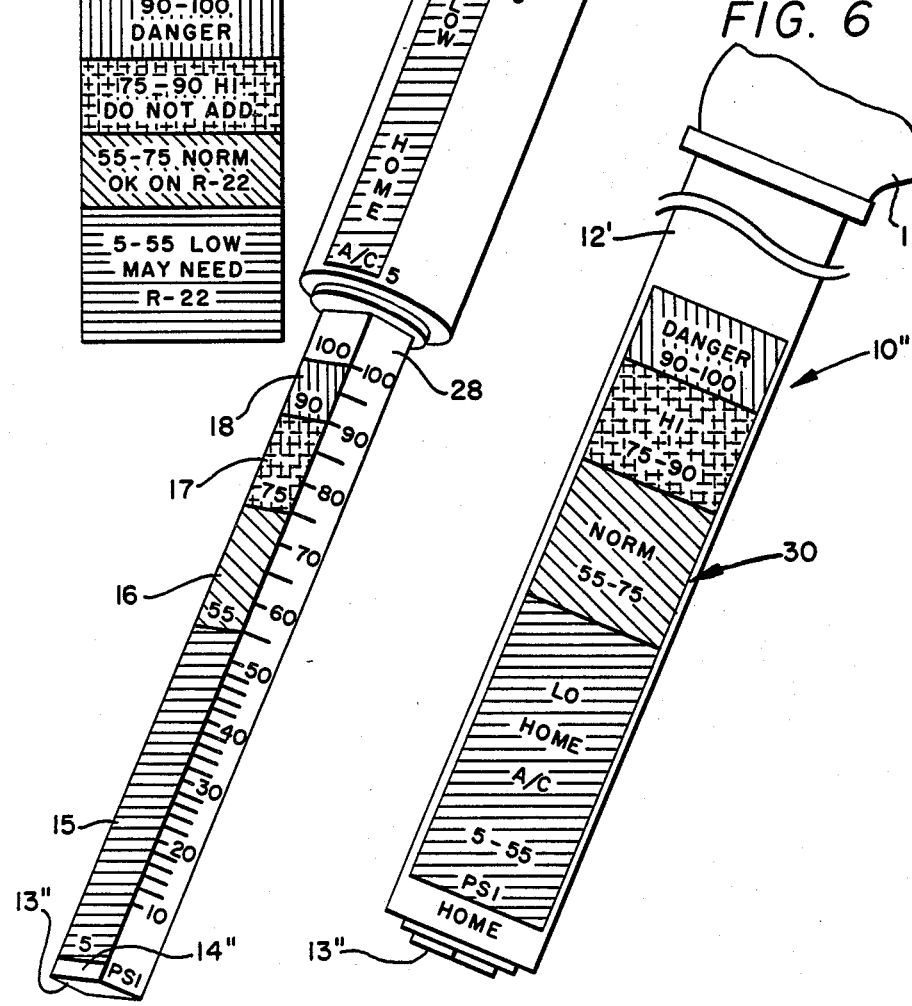

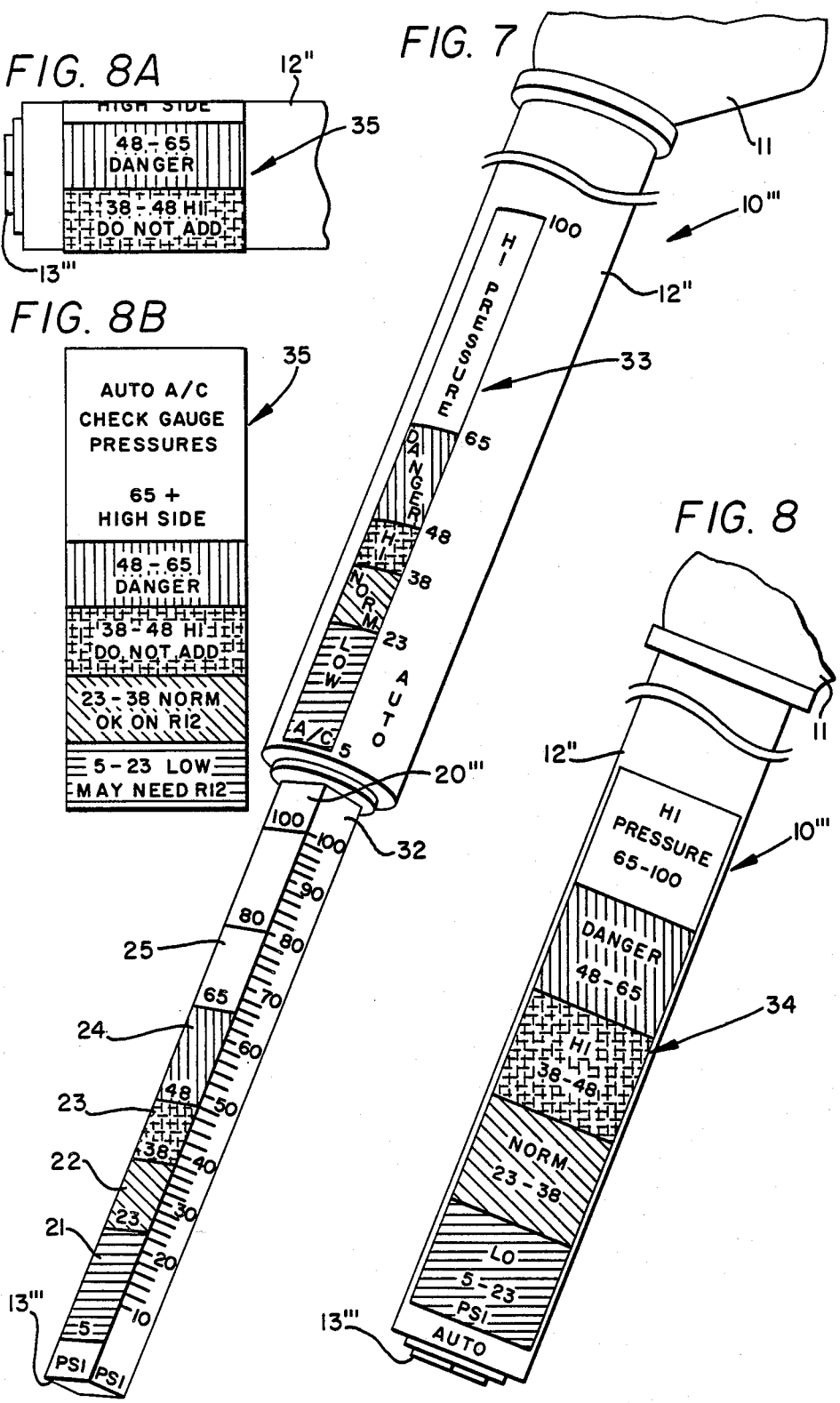

AIR CONDITIONER TEST GAUGE WITH PRESSURE ZONE MARKINGS

This is a continuation-in-part of my co-pending application Ser. No. 873,386, filed June 12, 1986, now U.S. Pat. No. 4,693,112.

This invention relates in general to refrigerant system fluid-gas pressure checking gauges, and more particularly, to an air conditioning test gauge with pressure zone markings directly matching precise pressure zones on the valve stem.

Heretofore, special and expensive tools and equipment have been needed to check the refrigerant level pressure in car air conditioning systems and other air conditioning systems. Use of such equipment can be awkward and demanding, requiring skill, experience and more knowledge than most people have on the subject. Any improvement in checking the refrigerant pressure level in both auto and home air conditioners and indication of when and how much refrigerant material to add is most welcome. This improvement is a pressure gauge like a tire pressure gauge equipped with a valve head that is shaped to fit on and over the low pressure side valve fitting of a refrigeration system and a valve stem with precise pressure zones that match colored zones and safety markings with worded indications including safety danger warnings. This makes use of the gauge much more convenient than heretofore in checking air conditioning systems with pressure zone indication more positively and conveniently available with and on the gauge itself. This eliminates separate printed pressure zone tables to interpret gauge pressure readings and having to independently distinguish between auto and home air conditioning system while pressure checking such systems.

Printed pressure zone tables in gauge packaging are discarded many times when gauges are unpackaged and even when saved have a tendency to become lost or misplaced and not available when needed.

It is therefore a principal object of this invention to provide for easy, quick, safe pressure checking of air conditioner refrigerant systems with an easy to use, easy to read and interpret pressure checking gauge.

Another object is to eliminate any need for expensive, complicated and hard to use refrigerant hose and dial gauge equipment for pressure checking.

A further object is to provide an air conditioner refrigerant pressure check gauge with pressure zone markings directly matching precise pressure zones on the valve stem for users convenience.

Still another object with such a gauge is eliminate any need for separate printed zone tables and the hazard of table loss or misplacement.

Features of the invention useful in accomplishing the above objects include, in an air conditioner test gauge with pressure zone markings, a gas pressure check gauge with a valve stem with precise pressure zones that match colored zones and safety markings with worded indications including safety danger warnings. The gauge has a multi-sided indicator stem having at least one side indicating pressure zones low, norm, hi, danger and hi-pressure that are color coded as well. At least one side of the indicator stem is pressure numbered to indicate gas pressure.

Specific embodiments representing what are presently regarded as the best mode of carrying out the invention are illustrated in the accompanying drawings.

In the drawings:

FIG. 1 represents a perspective view of an air conditioner refrigerant gas pressure check gauge with a rectangular indicator stem having pressure zone indications;

FIG. 2, a partial enlarged perspective view of the gauge stem of FIG. 1 showing home gauge zones color matched in zones LO in blue, NORM in green, HI in yellow, and then a red zone with zone limit PSI markings 55, 75, 90 and 100 on an adjacent face of the gauge stem;

FIG. 3, a partial enlarged perspective view of the gauge stem of FIG. 1 turned around to show the auto air conditioning faces of the gauge stem with on one stem face zones color hatched -LO in blue, NORM in green, HI in yellow, DANGER in red and then HI PRESSURE in white with on a clockwise adjoining stem face PSI zone matching markings 23, 38, 48, 65 and 100;

FIG. 4, a partial enlarged perspective view of a gauge stem as modified from the gauge stem of FIGS. 2 and 3 retaining the auto use sides of FIG. 3 but including a straight PSI indicator stem side for use of the gauge as a tire pressure checking gauge adaption;

FIG. 5, a partial enlarged perspective view of an air conditioner gas pressure check gauge with a rectangular indicator stem with home gauge zones color hatched LO in blue, NORM in green, HI in yellow, and then a red danger zone, with zone limit PSI markings among gradation marking from 10 to 100 PSI on a side of the stem, and a color coded and zone pressure printing with wordage extended along the enclosure body of the gauge;

FIG. 6, a partial enlarged perspective of a home A/C gauge with a modified color coded and zone pressure printing with wordage extended along the gauge enclosure body;

FIG. 6A, a partial enlarged view of a gauge enclosure body with a home A/C color coded and zone pressure printing with wordage extended around the gauge enclosure body;

FIG. 6B, a flattened out showing of the wrap around color coded and zone pressure printing with wordage of FIG. 6A;

FIG. 7, a partial enlarged perspective view of an auto air conditioner refrigerant gas pressure check gauge with a rectangular indicator stem with auto gauge zones color hatched LO in blue, NORM in green, HI yellow, DANGER in red, and a HI PRESSURE zone at the top in white with zone limit PSI markings, and gradation markings from 10 to 100 PSI on a side of the stem, and a color coded and zone pressure printing with wordage extended along the enclosure body of the gauge;

FIG. 8, a partial enlarged perspective of an auto A/C gauge with a modified color coded and zone pressure printing with wordage extended along the gauge enclosure body;

FIG. 8A, a partial enlarged body with an auto A/C color coded and zone pressure printing with wordage extended around the gauge enclosure body;

FIG. 8B, a flattened out showing of the warp around color coded and zone pressure printing with wordage of FIG. 8A.

Referring to the drawings:

The universal air conditioner refrigerant pressure gauge 10 of FIG. 1 is shown to have a valve head 11, a valve body 12, and a rectangular gauge stem 13 that is moveable outward from the valve body 12 to various degrees dependent on pressure input to the valve head 11 when it is pressed on a gas pressure valve fitting. Referring also to FIGS. 2 and 3 the rectangular gauge stem 13 is shown in FIG. 2 to have a home A/C gauge zones side 14 including LO zone 15 in blue, NORM zone 16 in green, HI zone 17 in yellow, and then a red zone 18, with PSI markings 55, 75, 90 and 100 aligned with respective zone upper pressure limits on adjacent face 19 of the gauge stem 13. The rectangular gauge stem 13 is shown in FIG. 3 to have an auto A/C gauge zoned side face 20 including LO zone 21 in blue, NORM zone 22 in green, HI zone 23 in yellow, DANGER zone 24 is red, and then a HI PRESSURE zone 25 in white, with PSI markings 23, 38, 48, 65 and 100 aligned with respective zone upper pressure limits on adjacent face 26 of the gauge stem 13.

With the air conditioner refrigerant pressure gauge 10' embodiment of FIG. 4 the gauge stem 13' in addition to having an auto A/C gauge zoned side face 20 that is accompanied with a PSI marked face with PSI markings 23, 38, 48, 65 and 100 aligned with respective zone upper pressure limits on an adjacent face, such as stem face 26 in FIG. 3, a straight PSI indicator stem face 27 is provided. The straight PSI indicator stem face 27 is provided for use of the gauge as a tire pressure checking gauge in addition to use as an auto air conditioner check gauge. It should also be noted that the specific PSI markings shown on stem face 26 in FIG. 3 could be superimposed on the otherwise straight PSI indicator stem face 27 of FIG. 4.

The home air conditioner gas pressure check gauge 10" of FIG. 5 has valve head 11, a valve body 12' and a rectangular gauge stem 13" with a home A/C gague zone side 14". These A/C zones include LO zone 15 in blue, NORM zone 16 in green, HI zone 17 in yellow and then a red zone 18 with a standard PSI marking side with zone limit PSI markings among gradation markings from 10 to 100 PSI on stem side 28. In addition a corresponding zone color coded and zone pressure limit printing 29 with wordage is extended along the valve enclosure body 12' for reference convenience with specific zone limits 55, 75, 90 and 100 printed in alignment with color zone limits.

The home A/C gauge 10" of FIG. 6 is the same as that of FIG. 5 except for the modified color coded zone pressure printing with wordage extended along the valve body 12' and with zone PSI range printed within each color coded zone.

With the gauge embodiment of FIGS. 6A and 6B the gauge enclosure body 12' is provided with a wrap around home A/C color coded and zone pressure printing 31 with wordage and zone PSI range printed theron. This may take the form of an adhesive backed printed form 31 shown in the flattened out state in FIG. 6B that is wrapped around in place on gauge body 12'.

The auto air conditioner gas pressure check gauge 10''' of FIG. 7 has valve head 11, a valve body 12" and a rectangular gauge stem 13''' with an auto A/C gauge zone side 20'''. These A/C zones include LO zone 21 in blue, NORM zone 22 in green, HI zone in yellow, DANGER zone 24 in red, and then a HI PRESSURE zone 25 in white with a standard PSI marking side with gradation markings from 10 to 100 PSI on stem side 32. In addition a corresponding zone color coded and zone pressure limit printing 33 with wordage is extended along the valve gauge enclosure body 12" for reference convenience with specific PSI limits 23, 38, 48, 65 and 100 printed in alignment with color zone limits.

The auto A/C gauge 10''' of FIG. 8 is the same as that of FIG. 7 except for the modified color coded zone pressure printing 34 with wordage extended along the valve body 12''' with zone PSI ranges printed within each color coded zone.

With the auto A/C gauge embodiment of FIGS. 8A and 8B the gauge enclosure body 12" is provided with a wrap around auto A/C color coded and zone pressure printing 35 with wordage and zone PSI ranges printed thereon. This may take the form of an adhesive backed printed form 35 shown in the flattened out state in FIG. 8B that is wrapped around in place on gauge body 12".

Whereas this invention has been described particularly with respect to several embodiments thereof, it should be realized that various changes may be made without departure from the essential contributions to the art made by the teachings hereof.

I claim:

1. A refrigerant system pressure gauge comprising: a pressure check gauge with a valve head having a valve head opening that fits on and over a refrigeration system valve fitting; a housing containing a gauge stem subject to being driven outward from a retracted state to various degrees of distance up to a fully extended state dependent on the gas pressure being measured by the check valve; colored zones on said valve stem, and pressure PSI markings aligned with respective colored zone upper pressure limits on said gauge valve stem to make pressure zone indication more positively and conveniently available with and on the gauge itself; wherein worded indications including safety danger warnings are provided on the pressure check gauge for respective colored zones; said gauge valve stem is a multi-sided stem; said pressure PSI markings aligned with respective colored zone upper pressure limits and said colored zones are on adjacent sides of said gauge valve stem; worded indications are included within said colored zones; said colored zones are for checking auto air conditioners with successively from lower pressures to higher pressures zones labelled, LO, NORM, HI, DANGER, and HI PRESSURE; said colored zones are respectively, LO in blue, NORM in green, HI in yellow, DANGER in red, and HI PRESSURE in white; and wherein an additional set of colored zones are provided on an additional face of said multi-sided stem for checking home air conditioning; and pressure PSI marking aligned with respective home colored zone upper pressure limits are also included.

2. The refrigerant system pressure check gauge of claim 1, wherein said pressure PSI markings aligned with respective colored zone upper pressure limits are coexistent therewith.

3. The refrigerant system pressure check gauge of claim 1, wherein said home air conditioner checking colored zones are labelled successively from lower pressures, LO, NORM and HI.

4. The refrigerant system pressure check gauge of claim 3, wherein said home colored zones are respectively, LO in blue, NORM in green, HI in yellow and then a top zone in red.

5. The refrigerant system pressure check gauge of claim 4, wherein the colored zones for home and auto pressure checking have different pressure PSI limits one from the other.

6. The refrigerant system pressure check gauge of claim 1, wherein a straight PSI indicator stem face is provided on a side of said multi-sided stem for use of the gauge as a tire pressure checking gauge in addition to use as an air conditioner pressure gauge.

7. The refrigerant system pressure check gauge of claim 1, wherein said gauge valve stem is a rectangular four-sided stem.

8. A refrigerant system pressure check gauge comprising: a pressure check gauge with a valve head having a valve head opening that fits on and over a refrigeration system valve fitting; a housing containing a gauge valve stem subject to being driven outward from a retracted state to various degrees of distance up to a fully extended state dependent on the gas pressure being measured by the check valve; colored zones on said valve stem; and pressure PSI markings aligned with respective colored zone upper pressure limits on said gauge valve stem to make pressure zone indication more positively and conveniently available with and on the gauge itself; wherein worded indications including safety danger warnings are provided on the pressure check gauge for respective colored zones; said gauge valve stem is a multi-sided stem; and wherein a color coded printing is provided on said housing with colors matching zone colors on said valve stem along the PSI markings; and with LOW, NORM, HI and DANGER indicated on respective color zones of the color coded printed on the housing.

9. The refrigerant system pressure check gauge of claim 8, wherein said color coded printing and the color zones on the valve stem are for home air conditioners with the color coded printing and zone limit PSI markings extended along the housing body of the gauge.

10. The refrigerant system pressure check gauge of claim 8, wherein said color coded printing and the color zones on the valve stem are for home air conditioners with the color coded printing and zone limit PSI markings wrapped around the housing body of the gauge.

11. The refrigerant system pressure check gauge of claim 8, wherein a zone HI PRESSURE is also indicated with said color coded printing and the color zones on the valve stem are for auto air conditioners with the color coded printing and zone limit PSI markings extended along the housing body of the gauge.

12. The refrigerant system pressure check gauge of claim 8, wherein a zone HI PRESSURE is also indicated with said color coded printing and the color zones on the valve stem are for auto air conditioners with the color coded printing and zone limit PSI markings wrapped around the housing body of the gauge.

13. A refrigerant system pressure check gauge comprising: a pressure check gauge with a valve head having a valve head opening that fits on and over a refrigeration system valve fitting; a housing containing a gauge valve stem subject to being driven outward from a retracted state to various degrees of distance up to a fully extended state dependent on the gas pressure being measured by the check valve; and pressure PSI markings on said gauge stem to make pressure zone indication more positively and conveniently available with and on the gauge itself; wherein worded indications including safety danger warnings are provided on the pressure check gauge for respective zone limit PSI markings; said gauge valve stem is a multi-sided stem; and wherein a color coded printing is provided on said housing with colors matching zone limit PSI markings; and with LOW, NORM, HI and DANGER indicated on respective color zones of the color coded printing on the housing.

14. A refrigerant system pressure check gauge comprising: a pressure check gauge with a valve head having a valve head opening that fits on and over a refrigeration system valve fitting: a housing containing a gauge valve stem subject to being driven outward from a retracted state to various degrees of distance up to a fully extended state dependent on the gas pressure being measured by the check valve; and pressure PSI markings on said gauge stem to make pressure zone indication more positively and conveniently available with and on the gauge itself; wherein worded indications including safety danger warnings are provided on the pressure check gauge for respective zone limit PSI markings; said gauge valve stem is a multi-sided stem; and wherein a coded printing is supported on said housing with matching zone limit PSI markings; and with LOW, NORM, HI and DANGER indicated on respective zones of the coded printing supported on the housing.

15. A refrigerant system pressure check gauge comprising: a pressure check gauge with a valve head having a valve head opening that fits on and over a refrigeration system valve fitting; a housing containing a gauge valve stem subject to being driven outward from a retracted state to various degrees of distance up to a fully extended state dependent on the gas pressure being measured by the check valve; and pressure PSI markings supported on said gauge to make pressue zone indication more positively and conveniently available with the gauge itself; wherein worded indications including safety danger warnings are supported on the pressure check gauge for respective zone limit PSI markings; said gauge valve stem is a multi-indication stem; and wherein a coded printing is supported on said housing with zone limit PSI markings; and with LOW, NORM, HI and DANGER indicated on respective zones of the coded printing supported on the housing.

* * * * *